United States Patent
Strang et al.

[11] 3,765,179
[45] Oct. 16, 1973

[54] PROPULSION POWER PLANT FOR AIRCRAFT

[75] Inventors: William John Strang, Abbots Leigh; Hugh Arthur Goldsmith, Redland, both of England

[73] Assignee: British Aircraft Corporation Limited, London, England

[22] Filed: July 2, 1971

[21] Appl. No.: 159,180

[30] Foreign Application Priority Data
July 8, 1970 Great Britain................. 33,055/70

[52] U.S. Cl.................. 60/262, 244/53 B, 137/15.1
[51] Int. Cl............................................. F02k 3/04
[58] Field of Search................. 60/262, 226 R, 224, 60/244, 226 A; 137/15.1, 15.2; 244/53 B

[56] References Cited
UNITED STATES PATENTS

| 3,176,462 | 4/1965 | Eckert | 60/244 |
| 2,978,868 | 4/1961 | Puffer | 60/226 |
| 3,447,325 | 6/1969 | Tiley | 137/15.2 |
| 3,430,640 | 3/1969 | Lennard | 137/15.1 |
| 2,632,295 | 3/1953 | Price | 137/15.1 |
| 2,989,843 | 6/1961 | Ferri | 60/226 |
| 3,060,679 | 10/1962 | Schmitt | 60/244 X |
| 3,161,018 | 12/1964 | Sandre | 60/244 X |

FOREIGN PATENTS OR APPLICATIONS
1,199,821  12/1959  France ................................. 60/244

Primary Examiner—Carlton R. Croyle
Assistant Examiner—Robert E. Garrett
Attorney—Sughrue, Rothwell, Mion, Zinn and Macpeak

[57] ABSTRACT

A propulsion power plant for use in a supersonic aircraft includes an aft-fan engine housed in a first duct which delivers air both to the aft-fan and to a further duct for delivery to the gas-generator portion of the engine, the intake of the further duct being positioned within the first duct so that it captures the relatively smooth airflow in the middle of the duct for delivery over a relatively short distance to the gas-generator, the relatively turbulent air at the edges of the first duct being delivered o the aft-fan over a relatively longer distance.

2 Claims, 1 Drawing Figure

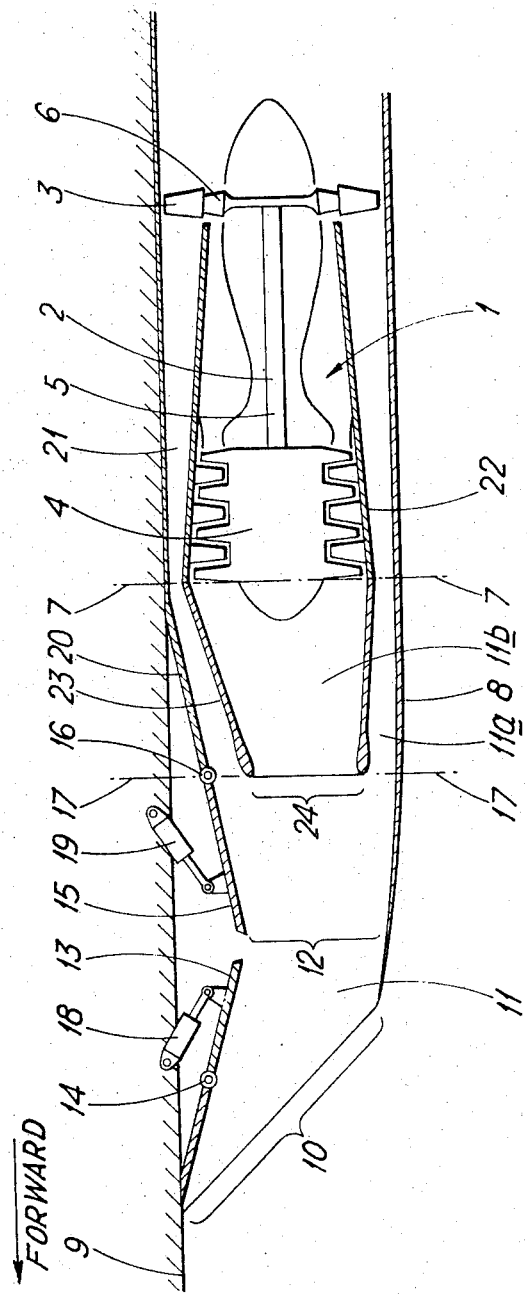

PROPULSION POWER PLANT FOR AIRCRAFT

The present invention relates to propulsion power plants for aircraft.

According to the present invention a propulsion power plant for supersonic aircraft includes a first air duct and, located therein, an engine of the ducted-fan gas turbine type having a gas-generator portion and a fan located toward the rear of the gas-generator portion, air speed reducing means at or near the front end of the duct for reducing the air within the duct to a subsonic speed, and a second air duct leading only to the gas-generator portion of the engine, the mouth of the second duct being within but spaced from the walls of the first duct and positioned forward of the front face of the gas-generator portion but aft of the air speed reducing means, the said mouth being formed of smaller cross-sectional area than that of the said front face such that the relatively smooth airflow toward the middle of the first duct is captured by the said mouth and is still further reduced in speed and delivered to the gas-generator over a relatively short distance, the relatively turbulent airflow toward the outer edge of the first duct being delivered to the fan over a relatively longer distance.

Preferably the first duct aft of the mouth of the second duct is formed to increase the speed of the air flowing through it until the plane of the gas-generator front face is reached and subsequently, aft of the said plane, the first duct is formed so as to decrease the speed of the air for delivery to the fan.

Preferably the air speed reducing means of the first duct includes a shock-wave producing throat of variable area.

The front face of the gas-generator is that face which lies in the plane of the first stage of the stator or compressor blades in that portion of the engine.

A preferred propulsion power plant is described with reference to the accompanying FIGURE which is a diagrammatic side elevation sectioned through its longitudinal centre line. There may be two or more of these power plants mounted side-by-side.

A turbofan engine 1 (that is to say a ducted-fan gas turbine) has a gas-generator portion 2 toward the rear of which is mounted a fan 3. The gas-generator includes a compressor 4 driven, by means of a shaft 5, by a turbine 6. The fan 3 is concentric with, and driven by, the turbine 6.

The front face of the gas-generator lies in the plane referenced 7—7.

The engine 1 is mounted in a nacelle 8 attached to the underside of an aircraft wing shown diagrammatically at 9. The nacelle 8 comprises a main intake 10 which is in flow connection with a duct 11 (the first duct). This duct 11 has a variable area throat 12, the area being varied in known manner by means of a flap 13 hinged at its forward edge 14 to the nacelle 8 and a flap 15 hinged at its aft edge 16 also to the nacelle structure. The aft edge 16 of the flap lies in a transverse plane 17—17. The angular position of the two flaps 13 and 15 is adjusted by means of jacks 18 and 19 respectively. The intake 10 and that part of the duct 11 forward of the plane 17—17 are of generally rectangular cross-section to facilitate provision of the variable area throat 12.

At the plane 17—17, the duct 11 continues as duct 11a which feeds the fan 3 whilst a further duct (the second duct), referenced 11b, is provided within the duct 11a to feed only the gas-generator 2.

Aft of the throat 12, the common walls 20 of the ducts 11 and 11a diverge rearwardly to a portion 21 of the duct 11a of substantially constant circular cross-section aft of the plane 7—7. This parallel-walled portion 21 is of a diameter to just contain the fan 3. Since the portion 21 is of circular cross-section, the duct 11 transforms from the rectangular to the circular cross-section between the planes 17—17 and 7—7. This transformation is made as gradual and as smooth as possible.

The gas generator 2 has an outer shell 22 which forms the inner boundary of the parallel-walled duct portion 21. This shell 22 is illustrated as a smooth outer casing of the gas-generator 2 itself but, alternatively, it can be a sheath over the gas generator 2. In either case it is of generally frusto-conical form tapering from a maximum diameter in the plane 7—7 to a minimum diameter at the fan 3. This part 21 of the duct 11a bounded externally by the parallel walls and internally by the outer shell 22 of the gas-generator 2 is thus of annular form and increases its area rearwardly; a diffuser is accordingly formed in which air for the fan 3 is relatively gradually decelerated.

Forward of the plane 7—7 the outer shell 22 of the gas generator 2 is extended by walls 23 to form the duct 11b which terminates in, and is in flow connection with, an intake mouth 24. This intake 24 lies in the plane 17—17 and is of generally rectangular cross section. Internally the walls 23 diverge rearwardly to form a diffuser through which air is relatively rapidly decelerated before delivery at the front face of the gas generator 2. Externally, the walls 23 of the duct 11b form the inner boundary of that part of the duct 11a lying between the planes 17—17 and 7—7 and which leads into the parallel-walled portion 21. Although the outer boundary of this part of the duct 11a formed by the walls 20 diverges rearwardly, the inner boundary formed by the walls 23 is such as to constrict this part of the duct 11a and thus accelerate the airflow through it.

The walls 23 transform gradually and smoothly from the rectangular shape of the intake 24 to the circular front face of the gas-generator in plane 7—7.

The intake 24 is positioned sufficiently forward of the plane 7—7 that is to say the front face of the gas-generator 3, to obtain an efficient diffusing effect within the duct 11b but sufficiently aft of the throat 12 to ensure that the air it accepts is subsonic. The intake 24 has well rounded lips to ensure the smooth capture of air in all flow conditions.

In use, assuming supersonic flight, the supersonic air entering the main intake 10 is decelerated by means of the shock waves caused by the throat 12. The air is then continued to be decelerated by the diverging part of the duct 11 until it reaches the plane 17—17 when a proportion is captured by the intake mouth 24. This proportion is then further decelerated by the divergent duct 11b before being delivered at the front face of the gas-generator 2.

The air not captured by the intake 24 passes into the convergent part of the duct 11a formed between the outer walls 20 and the inner walls 23 and is accelerated to a high subsonic speed by the time it reaches the plane 7—7 of the gas-generator front face. It is then subsequently decelerated in a relatively gradual manner as it passes through the divergent part of the duct 21 formed externally of the shell 22 and is delivered to the fan 3.

The power plant described provides an aft-fan engine installation for a supersonic aircraft without greatly increasing the installation length compared with that for a similarly powered non-fan jet engine. This is achieved, as earlier referred to, because the relatively smooth air flow in the centre of the main duct 11 captured by the intake mouth 24 is relatively rapidly diffused in duct 11b before presentation to the front face of the gas-generator without seriously disturbing the uniformity of flow which is essential to the efficient working of the gas-generator 2, whilst the relatively turbulent air flow accepted by the duct 11a can be made more uniform during passage through the comparatively long distance to the fan 3.

The comparatively long duct 11a also enables the cross-sectional area of the nacelle 8 to be maintained only slightly greater than for an otherwise similar non-fan jet engine installation since the fan air is readily accelerated to require only a small duct area at the plane 7—7 of the gas generator front face and is subsequently decelerated for deliverly to the fan 3.

In one example, supersonic air accepted by the main intake 10 is "shocked" down to M O. 65 at the throat 12 and is further decelerated to M O.57 in the plane 17—17. That proportion entering the duct 11b is further decelerated to M O.40 at the front face of the gas-generator whilst that in duct 11a is accelerated to M O.90 in the plane 7—7 and subsequently decelerated to M O.50 for delivery to the fan 3.

We claim:

1. A propulsion power plant for a supersonic aircraft comprising a first air duct having front and rear ends and located therein, an engine of the ducted-fan gas turbine type located within said first air duct, said engine having a gas-generator portion including a front face and being contained within an outer shell extending rearwardly from the front face and a fan located toward the rear of said gas-generator portion, air speed reducing means located near the front end of said first duct for reducing the air within the duct to subsonic speed, and a second duct leading only to the gas-generator portion of the engine, and being continuous with said outer shell, the mouth of the second duct being within and spaced from the walls of the first duct and positioned forward of the front face of the gas-generator portion and aft of said air speed reducing means, said mouth being of smaller cross-sectional area than that of the front face such that the relatively smooth air flow toward the middle of the first duct is captured by said mouth, said second duct having a diverging configuration such that said air flow therein is further reduced in speed and delivered to the gas-generator over a relatively short distance, with relatively turbulent air flow in the area of the outer edge of said first duct being delivered to said fan at the rear of said gas-generator portion over a relatively longer distance, said second duct aft of the mouth of the second duct, being divergent to approach the walls of said first duct aft of the mouth of the second duct until the plane of the gas-generator front face is reached to increase the speed of the air flow through said first duct until the plane of the gas-generator front face is reached, said outer shell of the gas-generator portion subsequently receding from the said walls of said first duct aft of said plane, such that during said relatively longer distance the air flow to the fan is increased in speed until the plane of the front face is reached and is subsequently decreased in speed for delivery to the fan, said first duct being of substantially constant circular cross section aft of the plane of the front face of the gas generator portion and just enclosing the fan, the gas-generator portion of the engine being tapered to a minimum transverse dimension at the fan.

2. A propulsion plant according to claim 1, in which the air speed reducing means of the first duct comprises a throat of variable area.

* * * * *